(12) United States Patent
Boot

(10) Patent No.: US 8,232,763 B1
(45) Date of Patent: Jul. 31, 2012

(54) ELECTRIC VEHICLE PROFILES FOR POWER GRID OPERATION

(75) Inventor: John Christopher Boot, Sandy Springs, GA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 13/112,121

(22) Filed: May 20, 2011

(51) Int. Cl.
*H02J 7/00* (2006.01)
*H02J 7/14* (2006.01)
*G01M 17/00* (2006.01)

(52) U.S. Cl. ........ 320/107; 320/104; 320/137; 701/32.3
(58) Field of Classification Search ............ 320/107, 320/137, 104
See application file for complete search history.

(56) References Cited

U.S. PATENT DOCUMENTS

| | | | |
|---|---|---|---|
| 5,790,976 A | * | 8/1998 | Boll et al. .............. 455/456.5 |
| 2011/0061015 A1 | * | 3/2011 | Drees et al. .............. 715/771 |
| 2011/0282508 A1 | * | 11/2011 | Goutard et al. ............. 700/293 |

* cited by examiner

*Primary Examiner* — M'Baye Diao
(74) *Attorney, Agent, or Firm* — Sutherland Asbill & Brennan LLP

(57) ABSTRACT

Electrical vehicle profiles for power grid operation. Embodiments of the invention can provide systems and methods for collecting and storing electrical vehicle usage and charging information, which may enable the generation of usage and charging profiles. Additionally, these usage and charging profiles may be usable to operate electricity grids in areas where electrical vehicles are prevalent. Grid maintenance, as well as power allocation, may be controlled based at least in part on the usage and charging profiles.

18 Claims, 5 Drawing Sheets

PROFILE DATA

| | Midwest | | | | South East | | | | Northwest | | | |
|---|---|---|---|---|---|---|---|---|---|---|---|---|
| | Average charge time | Min-Max | Average load | Min-Max | Average charge time | Min-Max | Average load | Min-Max | Average charge time | Min-Max | Average load | Min-Max |
| Major city | 1.4 hours | 0.8-6.2 | 2.8 KW | 2.4-3.3 | 1.4 hours | 0.8-6.2 | 2.8 KW | 3.2-3.3 | 3.4 hours | 0.8-6.2 | 2.8 KW | 2.4-3.3 |
| Urban area | 1.8 hours | 1.2-6.5 | 2.6 KW | 2.2-3.3 | 1.8 hours | 1.2-6.5 | 2.6 KW | 2.6-3.3 | 5.8 hours | 1.2-6.5 | 2.6 KW | 2.2-3.3 |
| Suburban area | 2.2 hours | 0.8-5.5 | 2.5 KW | 2.2-3.3 | 2.2 hours | 0.8-5.5 | 2.5 KW | 2.2-3.3 | 2.2 hours | 0.8-5.5 | 2.5 KW | 2.2-3.3 |
| Rural | 3.5 hours | 1.6-6.0 | 2.8 KW | 3.0-3.5 | 3.5 hours | 1.6-6.0 | 2.8 KW | 3.0-3.5 | 4.5 hours | 1.6-6.0 | 2.8 KW | 3.0-3.5 |

Further details by season
Further details by average temperature change
Deviations etc
Charge Start time eg 45% between 6 and 8 pm 15% 8 and 10pm

FIG. 5

ELECTRIC VEHICLE PROFILES FOR POWER GRID OPERATION

FIELD OF THE INVENTION

Embodiments of the invention relate generally to electric vehicles, and additionally to electric vehicle profiles for power grid operation.

BACKGROUND

Electric vehicle charging requires more planning than for refueling of gasoline vehicles, as there are limited places to recharge vehicle batteries and the charge time is typically hours instead of a few minutes. At peak times and locations there will be more demand for recharging spaces than there are available charging stations or charging capacity. As the quantity of electric vehicles on the road continues to grow, finding ways to manage electrical vehicle charging continues to be a priority.

SUMMARY

Some or all of the above needs and/or problems may be addressed by certain embodiments of the invention. Disclosed embodiments may include profiling electric vehicles and operating power grids based at least in part on the profiles. According to one embodiment of the invention, there is disclosed a system operable to receive vehicle information based at least in part on at least one vehicle, receive other information based at least in part on a charging station for the at least one vehicle, and transmit the vehicle information and the other information to a data receiving device.

According to another embodiment of the invention, there is disclosed a method for receiving at a predefined time interval, by an input device of a vehicle controller, vehicle information based at least in part on at least one vehicle and storing the vehicle information in at least one memory, receiving at the predefined time interval, by the input device of the vehicle controller, other information based at least in part on a location of a charging station associated with the at least one vehicle and storing the other information in the at least one memory, wherein the other information comprises location, climate, socio-economic, demographic, and/or grid topology information, and transmitting, by the vehicle controller to a utility provider, the vehicle information and the other information.

Further, according to another embodiment of the invention, there is disclosed one or more computer-readable media storing instructions for receiving, at a data receiving device from a vehicle or a vehicle charging station, vehicle information, wherein the vehicle information comprises a time of day when the vehicle was charged, a length of time the vehicle was charged, and/or a distance the vehicle traveled, receiving, at the data receiving device from the vehicle or the vehicle charging station, other information based at least in part on the vehicle charging station, wherein the other information comprises a location of the vehicle charging station, climate data of the location of the vehicle charging station, socio-economic information based at least in part on the location of the vehicle charging station, and/or socioeconomic information based upon an owner or operator of the vehicle or a location of the owner or operator of the vehicle, predicting power usage on a grid based at least in part on the received vehicle information and the received other information, and planning at least one change and/or upgrade to the grid based at least in part on the received vehicle information and the received other information.

Other embodiments, aspects, and features of the invention will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale, and wherein:

FIG. 5 is a spreadsheet diagram illustrating example profile data collected from PEVs, according to an embodiment of the invention.

DETAILED DESCRIPTION

Figure 1:
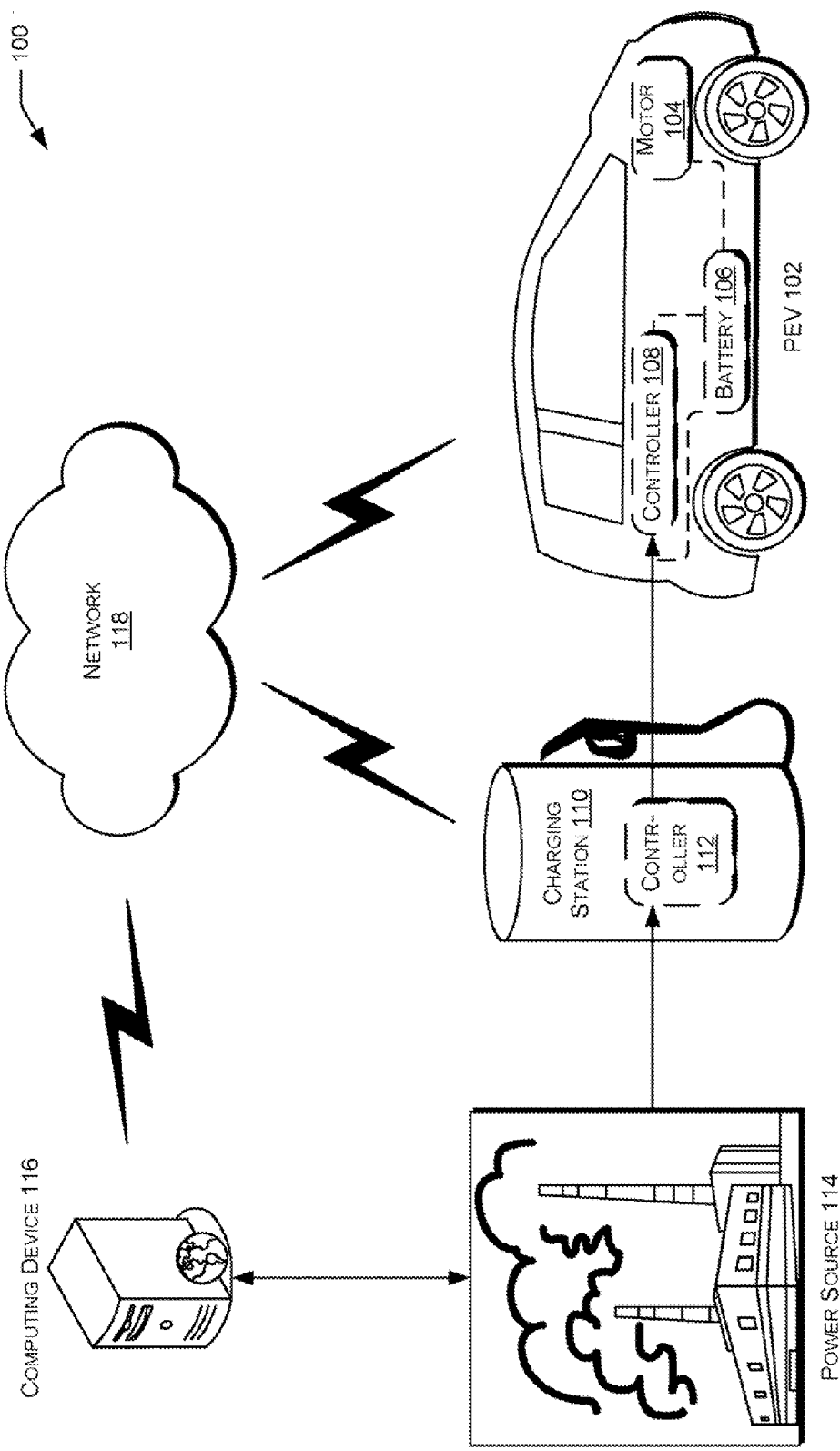
FIG. 1 is a schematic diagram of an illustrative architecture for implementing PEV profiling and grid operation based on PEV profiles, according to an embodiment of the invention.

Illustrative embodiments of the invention will now be described more fully hereinafter with reference to the accompanying drawings, in which some, but not all embodiments of the invention are shown. The invention may be embodied in many different forms and should not be construed as limited to the embodiments set forth herein; rather, these embodiments are provided so that this disclosure will satisfy applicable legal requirements. Like numbers refer to like elements throughout.

Illustrative embodiments of the invention are directed to, among other things, power grid operation and electric vehicle profiling. As an overview, electric vehicles can have a rechargeable battery or power source that can be recharged using a wired connection to a power supply, for example, by plugging into a power socket to access a power supply. Alternatively, these electric vehicles can be recharged wirelessly, perhaps through inductive coupling, where the inductive fields utilized for recharging may be generated using power from the power source. For convenience, a plug-in electric vehicle (PEV) that is referenced herein may refer to one or both of an electric vehicle that is rechargeable using a wired connection or a wireless connection. Likewise, it will be appreciated that these electric vehicles may be electric-only vehicles or hybrid vehicles that can operate using electricity or another power/fuel source such as gasoline, natural gas, other petroleum products, fuel cells, or the like. Any number of variations of electric vehicles may be utilized in accordance with example embodiments of the invention.

In some instances, an electric vehicle may also have one or more controllers for controlling battery charging and/or for collecting battery charging information. Such battery charging information may include dates, times, temperatures, and the like associated with the charging the electric vehicle battery. Additionally, the controllers may also collect data associated with travel of the electric vehicle, such as distances traveled, percentage of battery used, and the like for given times. Further, in some instances, a charging station may also have one or more controllers for controlling battery charging and/or for collecting charging data similar to that collected from a controller residing on an electric vehicle.

In some instances, unique electric vehicle usage profiles may be created based on the data collected at each controller. Usage profiles may also be created for geographic areas or climatic regions. As such, a usage profile may be created and assigned to a particular vehicle or may be assigned to all vehicles within a specific region or socio-economic class. These usage profiles may, in one example, indicate optimum charging profiles, for example when, where, and for how long a particular vehicle, class of vehicles, or set of vehicles should charge their batteries.

Usage profiles and charging profiles may be used by electricity providers to plan and operate power grids. For example, a collection of charging profiles may help define an amount of power requested for a particular portion of a power grid. Additionally, usage profiles may be aggregated to determine peak PEV charging times in certain locations of a grid. Upgrades and maintenance to electrical equipment may also be scheduled more effectively and efficiently when usage profiles and charging profiles are known by the provider.

FIG. 1 depicts an illustrative architecture 100 in which techniques for collecting charging and/or usage data for use in power grid operations may be implemented. In architecture 100, one or more plug-in electric vehicles (PEVs) 102 may be operated by respective automobile drivers and/or owners. In one aspect, PEV 102 may include, among other things, a motor 104, a battery 106, and a controller 108. The motor 104 may be any type of motor, electric, gas, hybrid, or otherwise, that may be used to propel the PEV 102. Further, the motor 104 of PEV 102 may be powered by battery 106 which may be coupled and controlled by controller 108. In at least one aspect, the controller 108 may control an amount of power provided the battery 106, a length of charge, or particular times when the battery 106 is to be charged. Additionally, in some aspects, the controller 108 may also collect charging and/or usage data of the PEV 102. As such, while not shown, the controller 108 may include computer-readable memory for storing the collected charging and/or usage data. Charging data may relate to the charging times, durations, temperatures, and the like of the battery 106 while being charged. Usage data may relate to the distance traveled, travel duration, temperature during travel, geographic location of travel, and the like of the PEV 102.

Architecture 100 also depicts charging station 110, although more than one charging station may be envisioned, for charging the one or more PEVs 102. A charging station 110 may be generally associated with a particular PEV 102, such as when located at a home of the driver/owner of the PEV 102. However, in other instances, charging stations 110 may be public or private charging stations that are used by more than one PEV 102. In some instances, the charging station 110 may also include a controller 112, with associated computer-readable memory, similar to controller 108 of PEV 102. The charging station controller 112 may control an amount of power, a duration of charge, or a time of day of charge of a PEV 102. Additionally, as with the PEV controller 108, the charging station controller 112 may collect charging and/or usage data of the charging station 110 and/or of the PEV 102 that it charged. As shown by the arrow connecting controller 112 with controller 108, the controller may communicate with one another during battery charging. Additionally, in some aspects, the controller 112 may control the amount of the electricity provided to the battery 106.

Architecture 100 also depicts a power source 114 for providing electricity to the charging station 110 and/or the PEV 102. In one aspect, power source 114 may be an electric or power grid supplied by one or more power plants, or distributed generation sources such as solar, wind, or gas generation that may or may not be utility owned. In other aspects, a power source 114 may be a power grid supplied by any type or combination of power plants, such as nuclear, gas, fossil power, hydroelectric, wind turbine, photovoltaic, or the like. In any event, the power source 114 may provide electricity to charging stations 110 for charging PEVs 102 or other electric devices, or it may provide electricity directly to the PEVs 102. Either way, charging and/or usage data may be collected by either controller 112 or controller 108. As such, the power source 114 may also include a controller.

In some aspects, the power source 114 may also include or communicate with one or more computing devices 116, such as a Web server, server farm, cloud service, etc., for collecting, processing, and/or storing usage and/or charging profile information. In one example, computing device 116 may be physically located at the power source 114. In other examples, however, or in conjunction with a local computing device, the computing device 116 may be located away from the power source 114. In any event, computing device 116, controller 112, and controller 108 may each include a networking device such as a network interface card, or other way to access public and/or private networks, for connecting to one or more networks, such as network 118. Network 118 may include any one or a combination of multiple different types of networks, such as cable networks, the Internet, wireless networks, and other private and/or public networks. While the illustrated example represents computing device 116, and controllers 112 and 108 communicating with each other over network 118, the described techniques may equally apply in instances where computing device 116, and controllers 112 and 108 interact with a service provider over the phone, via a kiosk, or in any other manner. It is also noted that the described techniques may apply in other client/server arrangements (e.g., set top boxes, etc.), as well as in non-client/server arrangements (e.g., locally-stored software applications, etc.).

By way of example only, architecture 100 depicts PEV 102 receiving electricity from charging station 110, and charging station 110 receiving electricity from the power source 114 at a remote location from the power source 114. In this example, either the PEV controller 108 or the charging station controller 112 may collect, process, and store usage profile and charging profile data. Additionally, in this example, the PEV controller 108 and/or the charging station controller 112 may determine a usage profile and/or a charging profile based at least in part on the usage profile and charging profile data, respectively. Further, the determined profile and/or charging profiles may then be communicated via network 118 to the computing device 116 of the power source 114. In this way, the power source 114 may utilize the usage profile and/or charging profile, along with other collected usage and/or charging profiles, to predict power usage on a power grid, plan power allocation on the grid, plan changes and/or upgrades to the grid, and otherwise operate the power grid. However, in other embodiments, the charging station 110 may be located at the power source 114. In this case, the controller 112 may be integrated or otherwise locally connected to the computing device 116 and network 118 may not be utilized.

The technical effects of embodiments of the invention may include providing usage and charging information and data regarding electric vehicles, determining usage and charging profiles to instruct electric vehicle operators when, where, and for how long the vehicle should be charged, enabling charging profiles to be transmitted to and displayed by, or to, the electrical vehicles and/or their operators, and/or providing information for enabling the operation, electricity allocation, maintenance, and/or upgrade of equipment on electrical power grids.

Figure 2:
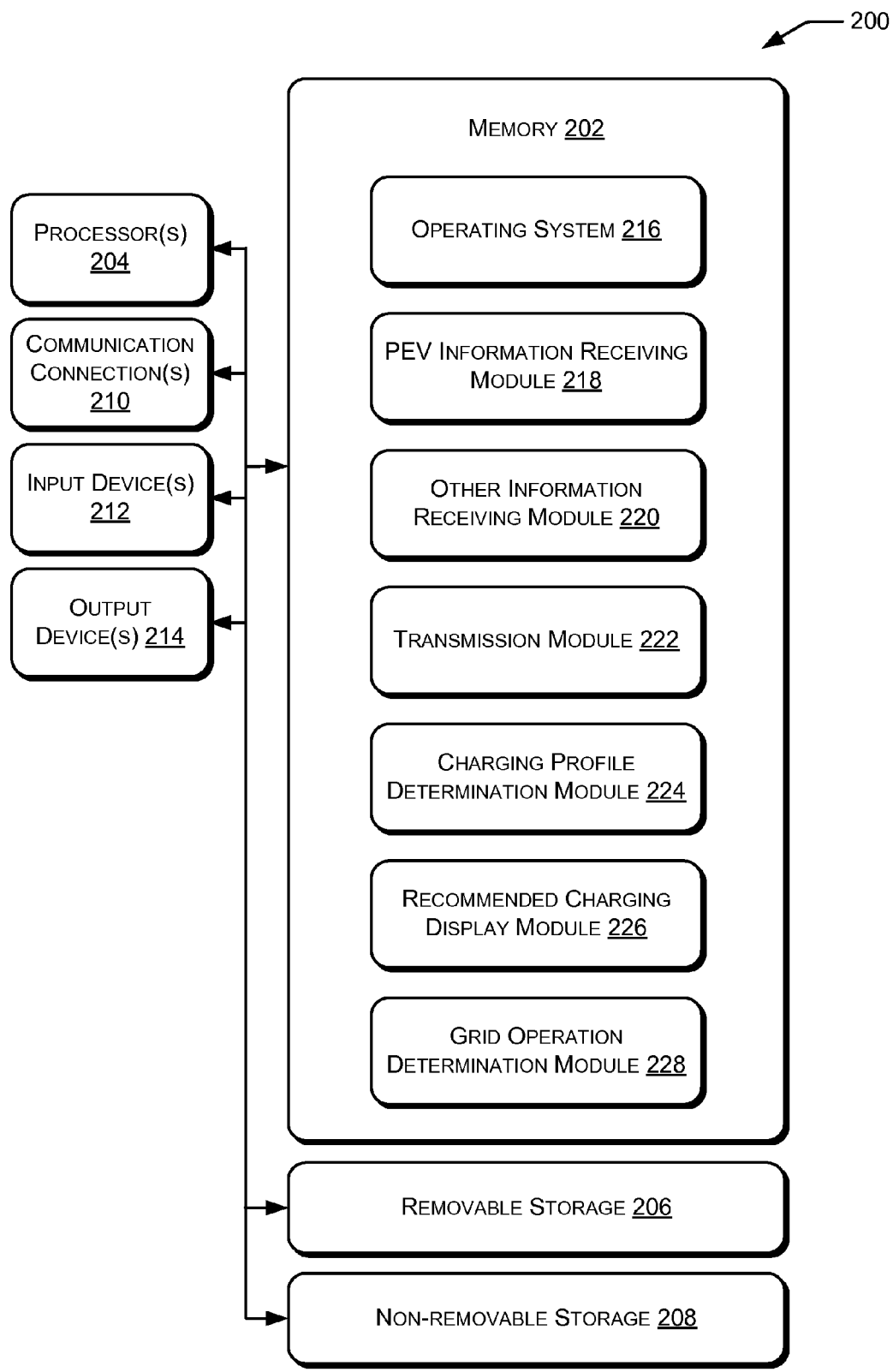
FIG. 2 is a block diagram of a computer environment showing an illustrative system with which PEV profiling and grid operation based on PEV profiles may be implemented, according to an embodiment of the invention.

FIG. 2 provides an illustrative overview of one computing device 200, in which aspects and features disclosed herein may be implemented. The computing device 200 may be configured as any suitable computing device capable of implementing the disclosed features, and accompanying methods, such as, but not limited to those described with reference to FIG. 1. By way of example and not limitation, suitable computing devices may include personal computers (PCs), servers, server farms, datacenters, or any other device capable of storing and executing all or part of the disclosed features.

In some aspects, the computing device 200 may be used to implement the PEV controller 108, the charging station controller 112, and/or the computing device 116 of the power source 114 of FIG. 1. As described above, the example computing device 200 may collect, process, and/or store usage and charging profile data, may determine usage and charging profiles, and/or may plan or operate a power grid. In some instances, the instructions performed by the computing device 200 may be discrete portions of the above tasks, while in other instances, such as when the charging station 110 is integrated with the power source 114 and the PEV 102 is plugged-in at the power source 114. That is, in this one non-limiting example, the example computing device 200 may perform every function of this disclosure. However, in other aspects, the example computing device 200 may act as the PEV controller 108, in which case, planning and/or operating of the power grid may not be implemented of the computing device 200.

In one illustrative configuration, the computing device 200 comprises at least a memory 202 and one or more processing units (or processor(s)) 204. The processor(s) 204 may be implemented as appropriate in hardware, software, firmware, or combinations thereof. Software or firmware implementations of the processor(s) 204 may include computer-executable or machine-executable instructions written in any suitable programming language to perform the various functions described.

Memory 202 may store program instructions that are loadable and executable on the processor(s) 204, as well as data generated during the execution of these programs. Depending on the configuration and type of computing device 200, memory 202 may be volatile (such as random access memory (RAM)) and/or non-volatile (such as read-only memory (ROM), flash memory, etc.). The computing device or server may also include additional removable storage 206 and/or non-removable storage 208 including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 202 may include multiple different types of memory, such as static random access memory (SRAM), dynamic random access memory (DRAM), or ROM.

Memory 202, removable storage 206, and non-removable storage 208 are all examples of computer-readable storage media. For example, computer-readable storage media may include volatile and non-volatile, removable and non-removable media implemented in any method or technology for storage of information such as computer-readable instructions, data structures, program modules or other data. Memory 202, removable storage 206, and non-removable storage 208 are all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can accessed by the server or other computing device. Combinations of the any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The computing device 200 may also contain communications connection(s) 210 that allow the computing device 200 to communicate with a stored database, another computing device or server, user terminals, and/or other devices on a network. The computing device 200 may also include input device(s) 212 such as a keyboard, mouse, pen, voice input device, touch input device, etc., and output device(s) 214, such as a display, speakers, printer, etc.

Turning to the contents of the memory 202 in more detail, the memory 202 may include an operating system 216 and one or more application programs or services for implementing the features disclosed herein including a PEV information receiving module 218. The PEV information receiving module 218 may be configured to receive data regarding times when the PEV 102 is being charged, lengths of time for which the PEV 102 is being charged, distances traveled by the PEV 102, and/or time intervals or durations of travel for the PEV 102. Additionally, the PEV information receiving module 218 may also store the PEV information in memory 202. In one aspect, the PEV information receiving module 218 may receive the PEV data directly from a PEV 102. However, in other aspects, as described above, the PEV information receiving module 218 may receive the PEV information over a network 118 from a controller of a PEV 102 or a controller of a charging station 110.

The memory 202 may further include an other information receiving module 220. The other information receiving module 220 may be configured to receive data other than that received by the PEV information receiving module 218, such as charging station location information, climate information of a charging station during a battery charge, socio-economic information of the location of the charging station, of an owner or operator of the PEV 102, or of a location of an owner or operator of the PEV 102. In some aspects, climate information may include temperature, wind speed, and/or humidity at a charging station 110 while a PEV 102 is being charged. Additionally, much like the PEV information receiving module 218, the other information receiving module 220 may also store the other information in memory 202. In one aspect, the other information receiving module 220 may receive the other data directly from a PEV 102 or charging station 110. However, in other aspects, the other information receiving module 220 may receive the other information over a network 118 from a controller of a PEV 102 or a controller of a charging station 110.

Additionally, the memory 202 may include a transmission module 222. In one aspect, the transmission module 222 may be configured to transmit PEV information or other information from one or more computing devices, such as computing device 116, charging station controller 110, and PEV controller 108, any predefined time interval, such as at a particular time for a particular duration. In at least one non-limiting example, the transmission module 222 of a PEV 102 may transmit PEV data and other data (e.g., usage profiles, charging profiles, etc.) to a PEV information receiving module 218 or an other information receiving module 220 of a charging station 110 or the computing device 116 of a power source 114.

The memory 202 may also include a charging profile determination module 224. In one aspect, the charging profile determination module 224 may be configured to determine a charging profile and/or a usage profile based on data received by either a PEV information receiving module 218 or an other information receiving module 220. By way of example only, a charging profile determination module 224 may determine a charging profile which may recommend when, where, and for how long a particular PEV 102 should conduct charging. The memory 202 may further include a recommended charging display module 226. In one aspect, the charging profile determination module 224 may determine recommended charging parameters, and may transmit this to the recommended charging display module 226 for display. That is, the recommended charging display module 226 may display the charging recommendation to the owner and/or driver of a PEV 102.

Additionally, memory 202 may further include a grid operation determination module 228. In one aspect, the grid operation determination module 228 may be configured to process the data received by the PEV information receiving module 218, the data received by the other information receiving module 220, information determined by the charging profile determination module 224, and/or information regarding the recommended charging parameters. Further, in some aspects, the grid operation determination module 228 may also be configured to determine operational procedures, such as planning power allocation, changes, and/or upgrades on the grid.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

The example architecture 100 and computing device 200 shown in FIGS. 1 and 2 are provided by way of example only. Numerous other operating environments, system architectures, and device configurations are possible. Accordingly, embodiments of the present disclosure should not be construed as being limited to any particular operating environment, system architecture, or device configuration.

Figure 3:
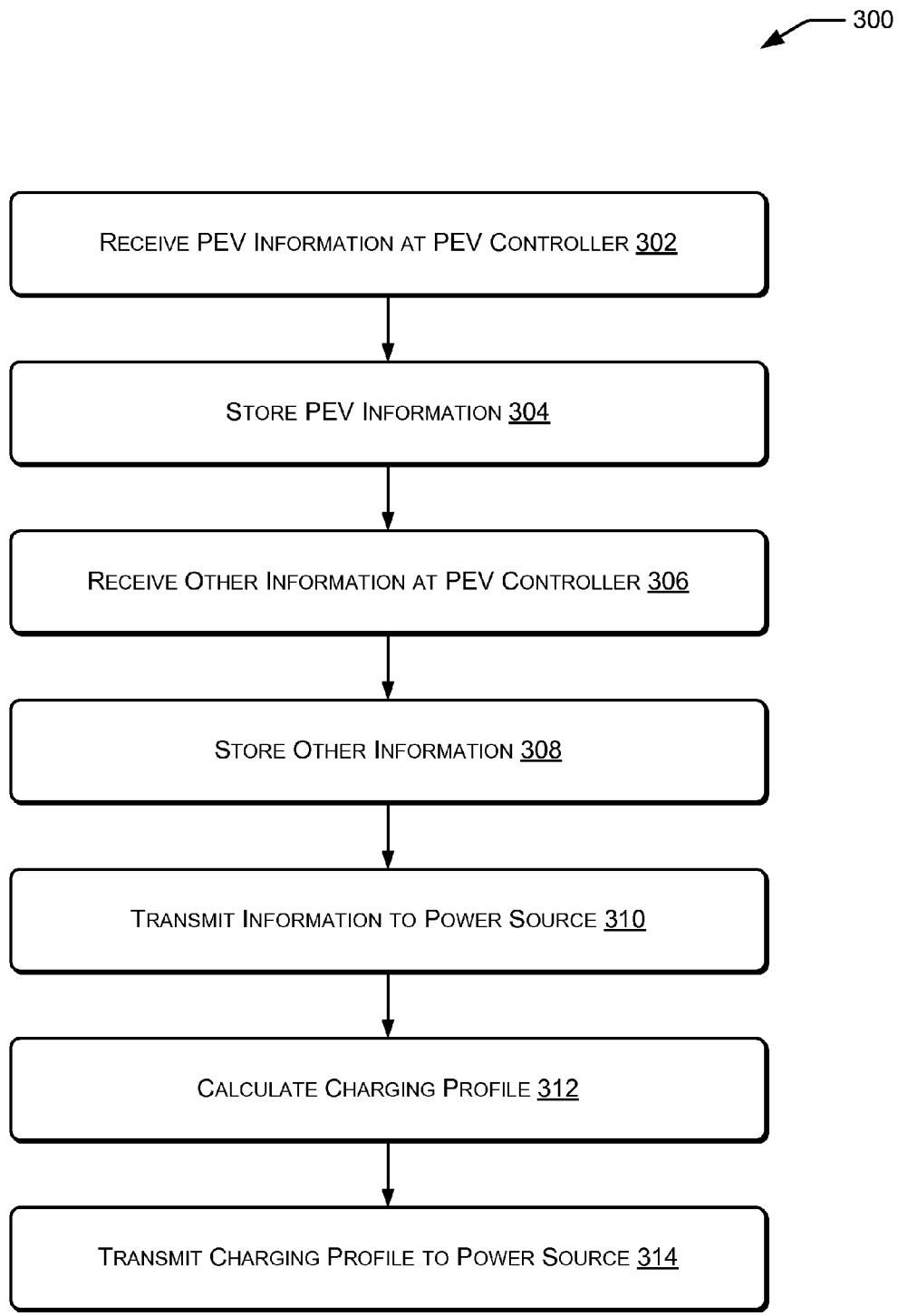
FIG. 3 is a flowchart illustrating details of an example method for implementing PEV profiling, according to an embodiment of the invention.
Figure 4:
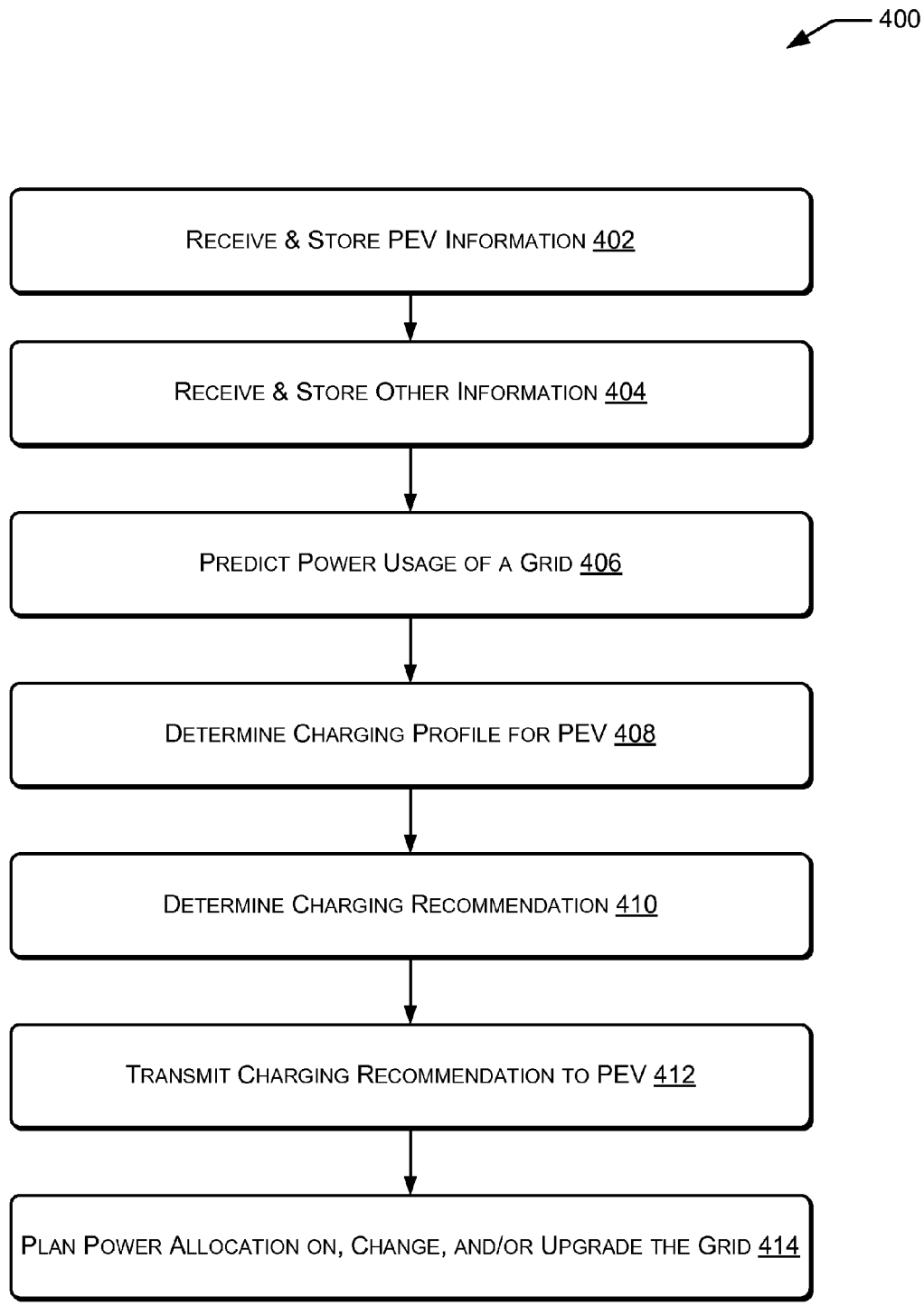
FIG. 4 is a flowchart illustrating details of an example method for implementing PEV profiling and grid operation based on PEV profiles, according to an embodiment of the invention.

FIGS. 3 and 4 are flow diagrams of illustrative processes 300 and 400 for implementing grid operation based on PEV profiling, respectively, as described with reference to FIGS. 1 and 2. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 3 illustrates an example flow diagram of process 300 for implementing PEV profiling, as discussed above. In one example, the illustrative computing device 116, the illustrative PEV controller 108, and/or the illustrative charging station controller 112 of FIG. 1 may perform any or all of the operations of process 300.

In this particular implementation, the process 300 may begin at block 302 of FIG. 3 in which the process 300 may receive PEV information at the PEV controller 108. In this example, PEV information may include, but is not limited to, the time when the PEV 102 was charged, the length of time the PEV 102 was charging, and/or the distance the PEV 102 traveled during a predefined period. At block 304, the process 300 may store the PEV information in any computer-readable storage medium, such as local memory of the PEV controller 108, memory in the cloud of network 118, or some other memory accessible to the PEV controller 108.

At block 306, the process 300 may receive other information at the PEV controller 108, possibly from the charging station controller 112. In this example, the other information may include, but is not limited to, the location of the charging station 110, socio-economic information based on the location of the charging station 110, based on the owner (or operator) of the vehicle and/or the location of the owner (or operator) of the vehicle, and/or the grid topology at or near the location of the charging station 110. At block 308, the process 300 may store the other information in any computer-readable storage medium.

Additionally, the process 300 may transmit information to the power source 114 or the computing device 116 of the power source 114 at block 310. In some aspects, the process 300 may transmit either PEV information or other information. In other aspects, the process 300 may transmit both PEV information and other information. At block 312, the process 300 may calculate a charging profile for the PEV 102 or for a geographic or socio-economic area. In one aspect, a charging profile may indicate where, when, and/or for how long a PEV 102 should be charged in the future.

In some aspects, at block 312, the process 300 may calculate a charging profile based partly on the PEV information and/or the other information received at blocks 302 and 306, respectively. Further, at block 314, the process 300 may transmit the calculated charging profile to the power source 114.

FIG. 4 illustrates an example flow diagram of process 400 for implementing grid operations based on PEV profiles, as discussed above. In one example, the illustrative computing device 116, the illustrative PEV controller 108, and/or the illustrative charging station controller 112 of FIG. 1 may perform any or all of the operations of process 400.

In this particular implementation, the process 400 may begin at block 402 of FIG. 4 in which the process 400 may receive and store PEV information at a data receiving device such as PEV controller 108 or charging station controller 112. Further, at block 404, the process 400 may receive and store other information at a data receiving device. At block 406, the process 400 may predict power usage on a power grid based at least partly on the received and stored PEV information and other information.

At blocks 408 and 410, the process 400 may determine, also based at least partly on the received information, charging profiles for PEVs and charging recommendations for the PEVs, respectively. Additionally, at block 412, the process 400 may transmit the charging recommendation to the PEV. In some aspects, transmitting the charging recommendation may include transmitting the recommendation from the charging station controller 112 to the PEV controller 108. Alternatively, or in addition, transmitting the charging recommendation may include transmitting the recommendation from the PEV controller 108 to a display device of the PEV 102. Further, at block 414, the process 400 may plan power allocation, changes, and/or upgrades to the power grid based at least partly on charging profiles, the charging recommendations, and the power usage on the grid.

Illustrative methods and systems of implementing PEV profiling and grid operation based on PEV profiles are described above. Some or all of these systems and methods may, but need not, be implemented at least partially by architectures such as those shown in FIGS. 1 and 2 above.

FIG. 5 illustrates example profile data collected over time from one or more PEVs that are configured with a controller, such as PEV controller 108, or other device for collecting and transmitting, PEV data. As can be seen in FIG. 5, the data may be organized based on geographic area, such as Midwest, South East, and Northwest. Additionally, the data may also be organized within the geographic area based on socio-economic status or, as seen in FIG. 5, based on regions within a city, such as major city, urban area, suburban area, and rural area. Average charge times, minimum and maximum charge times, average loads on the grid, as well as minimum and maximum loads on the grid may all be collected and used to determine a charging profile for a PEV.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A system, comprising:
at least one memory that stores computer-executable instructions; and
at least one processor configured to access the at least one memory, wherein the at least one processor is configured to execute the computer-executable instructions to:
receive vehicle information based at least in part on at least one vehicle;
receive other information based at least in part on a charging station for the at least one vehicle; and
transmit the vehicle information and the other information to a data receiving device, wherein the vehicle information and the other information are utilized for planning power allocation on a grid, predicting power usage on the grid, and/or staggering vehicle charging.

2. The system of claim 1, wherein the vehicle information comprises a time when the at least one vehicle was charging, a length of time the at least one vehicle was charging, and/or a distance the at least one vehicle traveled during a predefined time period.

3. The system of claim 1, wherein the other information comprises a location of the charging station, climate data during a predefined time period at or near the location of the charging station, socio-economic information based at least in part on the location of the charging station, socio-economic information based at least in part on an owner or operator of the vehicle and/or a location of the owner or operator of the vehicle, and/or a grid topology at or near the location of the charging station, wherein climate data comprises temperature, wind speed, and/or humidity.

4. The system of claim 1, wherein the at least one memory and the at least one processor are coupled with the charging station, and wherein a transmission device of the charging station transmits the vehicle information and the other information to the data receiving device.

5. The system of claim 1, wherein the at least one memory and the at least one processor are coupled with the vehicle, and wherein a transmission device of the vehicle transmits the vehicle information and the other information to the data receiving device.

6. The system of claim 1, wherein the data receiving device is operated by a utility service provider.

7. The system of claim 1, wherein the vehicle information and/or the other information is transmitted substantially immediately after its reception.

8. The system of claim 1, wherein the vehicle information and/or the other information is stored in the at least one memory prior to transmission to the data receiving device.

9. The system of claim 1, wherein the at least one processor is further configured to execute the computer-executable instructions to determine a charging profile for the at least one vehicle based at least in part on the vehicle information and/or the other information.

10. The system of claim 9, wherein the at least one processor is further configured to execute the computer-executable instructions to display information to indicate a recommended time to charge the at least one vehicle, a recommended charging duration of the at least one vehicle, and/or a recommended charging location of the at least one vehicle based at least in part on the charging profile.

11. A method, comprising:
receiving at a predefined time interval, by an input device of a vehicle controller, vehicle information based at least in part on at least one vehicle and storing the vehicle information in at least one memory;
receiving at the predefined time interval, by the input device of the vehicle controller, other information based at least in part on a location of a charging station associated with the at least one vehicle and storing the other information in the at least one memory, wherein the other information comprises location, climate, socio-economic, demographic, and/or grid topology information; and
transmitting, by the vehicle controller to a utility provider, the vehicle information and the other information, wherein the vehicle information and the other information are utilized for planning power allocation on a grid, predicting power usage on the grid, and/or staggering vehicle charging.

12. The method of claim 11, wherein the vehicle information comprises a time of day associated with the predefined time interval, an amount of the predefined time interval that the at least one vehicle was charging, and/or a distance the at least one vehicle traveled during the predefined time interval.

13. The method of claim 11, wherein the vehicle controller is located on the at least one vehicle or on the charging station of the at least one vehicle.

14. The method of claim 11, further comprising determining a charging profile for the at least one vehicle based at least in part on the stored vehicle information and the stored other information.

15. The method of claim 14, further comprising transmitting, by the vehicle controller to the utility provider, the charging profile at each predefined time interval or at a second predefined time interval greater than the predefined time interval.

16. One or more computer-readable media storing computer-executable instructions that, when executed by at least one processor, perform operations comprising:
- receiving, at a data receiving device from a vehicle or a vehicle charging station, vehicle information, wherein the vehicle information comprises a time of day when the vehicle was charged, a length of time the vehicle was charged, and/or a distance the vehicle traveled;
- receiving, at the data receiving device from the vehicle or the vehicle charging station, other information based at least in part on the vehicle charging station, wherein the other information comprises a location of the vehicle charging station, climate data of the location of the vehicle charging station, socio-economic information based at least in part on the location of the vehicle charging station, and/or socio-economic information based upon an owner or operator of the vehicle or a location of the owner or operator of the vehicle;
- predicting power usage on a grid based at least in part on the received vehicle information and the received other information; and
- planning at least one change and/or upgrade to the grid based at least in part on the received vehicle information and the received other information.

17. The one or more computer-readable media of claim 16, further storing computer-executable instructions that, when executed by the at least one processor, perform operations comprising determining a charging profile for the vehicle based at least in part on the received vehicle information and the received other information; and determining a recommendation of when, where, and/or for how long to charge the vehicle based at least in part on the determined charging profile and current climate conditions.

18. The one or more computer-readable media of claim 17, further storing computer-executable instructions that, when executed by the at least one processor, perform operations comprising transmitting, to the vehicle or the vehicle charging station, the recommendation of when, where, and/or for how long to charge the vehicle.

* * * * *